(12) United States Patent
Sano et al.

(10) Patent No.: US 6,562,117 B2
(45) Date of Patent: May 13, 2003

(54) PROCESS FOR PRODUCING PIGMENT DISPERSION

(75) Inventors: Tsuyoshi Sano, Nagano-Ken (JP); Teruhito Kojima, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/952,217

(22) Filed: Sep. 13, 2001

(65) Prior Publication Data

US 2002/0100392 A1 Aug. 1, 2002

(30) Foreign Application Priority Data

Sep. 18, 2000 (JP) ........................................ 2000-281348
Oct. 17, 2000 (JP) ........................................ 2000-316555

(51) Int. Cl.$^7$ .............................................. C09D 11/02
(52) U.S. Cl. ................. 106/31.6; 106/31.64; 106/31.65; 106/402; 106/472; 106/476; 106/494; 106/495; 106/496; 106/497; 106/498; 106/499; 347/100
(58) Field of Search ............................. 106/31.6, 31.64, 106/31.65, 493, 499, 402, 412, 472, 494, 495, 496, 497, 498, 476; 347/100

(56) References Cited

U.S. PATENT DOCUMENTS

| 4,436,523 | A | * | 3/1984 | Hugelshofer et al. | .......... 8/527 |
|---|---|---|---|---|---|
| 5,622,628 | A | * | 4/1997 | Trendell et al. | .............. 210/651 |
| 5,672,201 | A | * | 9/1997 | Simpson et al. | ............. 106/447 |
| 6,328,894 | B1 | * | 12/2001 | Chan et al. | .................. 210/638 |

FOREIGN PATENT DOCUMENTS

| DE | 33 01 870 | * | 7/1984 | |
| DE | 35 39 727 | * | 5/1986 | |
| DE | 195 03 191 | * | 8/1996 | |
| JP | 287836 | | 10/1998 | ........... C09D/11/00 |
| JP | 2000-119570 | * | 4/2000 | |

OTHER PUBLICATIONS

JPO Abstract 10(1998)–287836, Oct. 27, 1998.

* cited by examiner

Primary Examiner—Anthony J. Green
(74) Attorney, Agent, or Firm—Ladas & Parry

(57) ABSTRACT

There is provided a method for regulating the average particle diameter of a pigment for an ink composition possessing excellent anti-clogging properties and ejection stability. The method comprises the steps of: dispersing the pigment in a solvent to prepare a stock pigment dispersion; and subjecting the stock pigment dispersion to crossflow membrane filtration.

31 Claims, 3 Drawing Sheets

PROCESS FOR PRODUCING PIGMENT DISPERSION

BACKGROUND OF THE INVENTION

1. Field of the Invention

The present invention relates to a process for producing a dispersion of a pigment having a regulated average particle diameter.

2. Background Art

Ink jet recording is a printing method wherein droplets of an ink composition are ejected and deposited on recording media, such as paper, to perform printing. The feature of the ink jet recording method is that images having high quality with high resolution can be printed at a high speed by means of a relatively inexpensive apparatus.

Ink compositions used in ink jet recording generally comprise water as a main ingredient, a colorant and a wetting agent, such as glycerin, for clogging preventive purposes and the like. A large number of water-soluble dyes have been used as the colorant for the ink composition for ink jet recording, for example, from the viewpoints of high chroma of the coloring material, a wide variety of usable coloring materials, and solubility in water.

On the other hand, because of good lightfastness and waterfastnes of pigments studies have been made in recent years on the use of pigments as, a colorant in ink compositions for ink jet recording, for improving lightfastness and waterfastness of prints. Since pigments are generally insoluble in water, the pigments necessitate the mixing and dispersing process in which the pigment is, for example, mixed together with a resin called a dispersant to stably disperse the pigment in water and then an ink composition is prepared from the dispersant. In order to stably disperse a pigment in an aqueous solvent, it is necessary to study the type and particle diameter of pigments, the type of resins used, dispersing means and the like. Up to now, a large number of dispersion methods and production processes of inks for ink jet recording have been proposed in the art.

In the production of the: ink composition, it is common practice to mix a pigment, a dispersant, and optionally a water-soluble organic solvent together in a suitable dispergator or a mixer to prepare a mixture which is then filtered to remove coarse particles and unnecessary materials. For example, Japanese patent Laid-Open No. 287836/1998 proposes a process for producing an ink jet ink, comprising the steps of: adsorbing a resin onto carbon black; and then removing at least a part of the resin not adsorbed onto the carbon black by ultrafiltration.

So far as the present inventors know, however, any production process of a dispersion of a pigment having a regulated average particle diameter by removing coarse pigment particles through membrane filtration has not been proposed yet in the art.

SUMMARY OF THE INVENTION

The present inventors have now found that crossflow membrane filtration can efficiently produce a good dispersion of a pigment having an average particle diameter regulated so as to fall within a given average particle diameter range. Further, the present inventors have found that the ink composition using the pigment dispersion produced by this process is good in excellent ejection stability and can realize images possessing good color reproduction. The present invention has been made based on such finding.

Accordingly, it is an object of the present invention to provide a process for producing a pigment dispersion which can realize an ink composition having excellent ejection stability and capable of yielding good images, especially images possessing excellent color reproduction.

According to a first aspect of the present invention, there is provided a process for producing a dispersion of a pigment having a regulated average particle diameter, said process comprising the steps of:

dispersing the pigment in a solvent to prepare a stock pigment dispersion; and subjecting the stock pigment dispersion to crossflow membrane filtration to recover a liquid, which is passed through the filtration membrane, or a liquid, which is not passed through the filtration membrane, as a pigment dispersion.

According to a second aspect of the present invention, there is provided a process for producing a dispersion of a pigment having a regulated average particle diameter, said process comprising the steps of:

dispersing the pigment in a solvent to prepare a stock pigment dispersion;

subjecting the stock pigment dispersion to first-stage crossflow membrane filtration to recover a liquid, which is passed through the filtration membrane; and subjecting said liquid to second-stage crossflow membrane filtration to recover a liquid, which is not passed through the filtration membrane, as a pigment dispersion, the average pore diameter of the membrane used in the first-stage crossflow membrane filtration being larger than the average pore diameter of the membrane used in the second-stage crossflow membrane filtration.

According to a third aspect of the present invention, there is provided a process for producing a dispersion of a pigment having a regulated average particle diameter, said process comprising the steps of:

dispersing the pigment in a solvent to prepare a stock pigment dispersion;

subjecting the stock pigment dispersion to first-stage crossflow membrane filtration: to recover a liquid, which is not passed through the filtration membrane; and subjecting said liquid to second-stage crossflow membrane filtration to recover a liquid, which is passed through the filtration membrane, as a pigment dispersion, the average pore diameter of the membrane used in the first-stage crossflow membrane filtration being smaller than the average pore diameter of the membrane used in the second-stage crossflow membrane filtration.

DETAILED DESCRIPTION OF THE INVENTION

Production of Pigment Dispersion a) Preparation of Stock Pigment Dispersion

The stock pigment dispersion according to the present invention is prepared by mixing and dispersing a pigment and a solvent together. Conventional means may be used as a method for mixing and dispersing a pigment and a solvent, and specific examples thereof include mixing and dispersing in a dispergator/mixer, for example, a ball mill, a sand mill, an attritor, a roll mill, an agitator mill, a Henschel mixer, a colloid mill, an ultrasonic homogenizer, a jet mill, or an angmill.

b) Membrane Filtration

In the production process of a pigment dispersion according to the present invention, the stock pigment dispersion thus prepared is subjected to crossflow membrane filtration.

In the present invention, the "membrane filtration" refers to an operation such that a liquid to be filtered is allowed to come into contact with a filtration membrane, preferably comes into contact with a filtration membrane while applying pressure, to separate one component, which is passed through the filtration membrane, and another component which is not passed through the filtration membrane. Membrane filtrations include ultrafiltration, microfiltration, osmosis, reverse osmosis, and dialysis. According to the present invention, ultrafiltration and microfiltration are preferred.

According to the present invention, the membrane filtration is carried out in the form of crossflow. The "crossflow" refers to an operation such that, in the membrane filtration, the liquid to be filtered is allowed to flow in the direction of the axis of the filtration membrane and is moved so that the filtrate crosses the filtration membrane.

Filtration membranes utilizable in the present invention include polymeric membranes and ceramic membranes. Specific examples of polymeric membranes include membranes of cellulose, nitrocellulose, polyvinyl alcohol, polyvinyl chloride, nylon, polyester, polyethylene, polysulfone, and polyethersulfone. Specific examples of ceramic membranes include porous filtration membranes of alumina. The form of the filtration membrane may be properly determined by taking into consideration, for example, service conditions, and examples thereof include tubular, hollow, flat plate, hollow filament and other forms.

According to the present invention, commercially available filtration membranes may be used, and specific examples thereof include Filton ultrafiltration system "Centramate" or the like (manufactured by Paul) and ultrafiltration system "Minitan" (manufactured by Millipore).

Membrane Filtration in First Aspect of Present Invention

The membrane filtration in the first aspect of the present invention provides a process for producing a dispersion of a pigment having an average particle diameter which is regulated by crossflow membrane filtration.

In the first aspect of the present invention, the stock pigment dispersion is subjected to crossflow membrane filtration to recover a liquid, which is passed through the filtration membrane, or a liquid, which is not passed through the filtration membrane, as a pigment dispersion.

In the first aspect of the present invention, the average pore diameter of the filtration membrane in the crossflow membrane filtration may be properly determined by taking into consideration the desired average pigment particle diameter. The average pore diameter, however, is generally in the range of about 1 nm to 1 $\mu$m, preferably in the range of about 0.01 to 1 $\mu$m. The filtration through this membrane can provide a dispersion of a pigment having an average particle diameter which is regulated so as to fall within the range of about 10 to 300 nm, preferably in the range of about 10 to 200 nm.

The time, pressure and the like for crossflow membrane filtration may be properly determined by taking into consideration, for example, the particle diameter and coagulation properties of the pigment to be filtered.

In the first aspects of the present invention, if necessary, the liquid, which is not passed through the filtration membrane in the crossflow membrane filtration of the stock pigment dispersion, together with a new stock pigment dispersion, may be again subjected to crossflow membrane filtration. Likewise, if necessary, the liquid, which is passed through the filtration membrane in the crossflow membrane filtration of the stock pigment dispersion, together with a new stock pigment dispersion, may be again subjected to crossflow membrane filtration.

Figure 1:
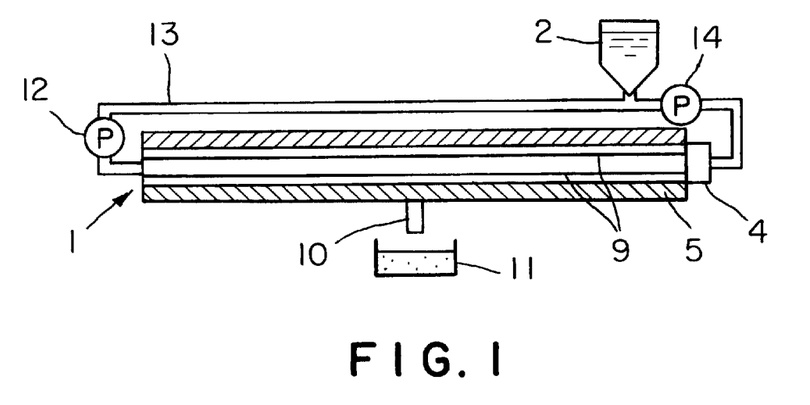
FIG. 1 is a general view of a crossflow membrane filtration apparatus.
Figure 2:
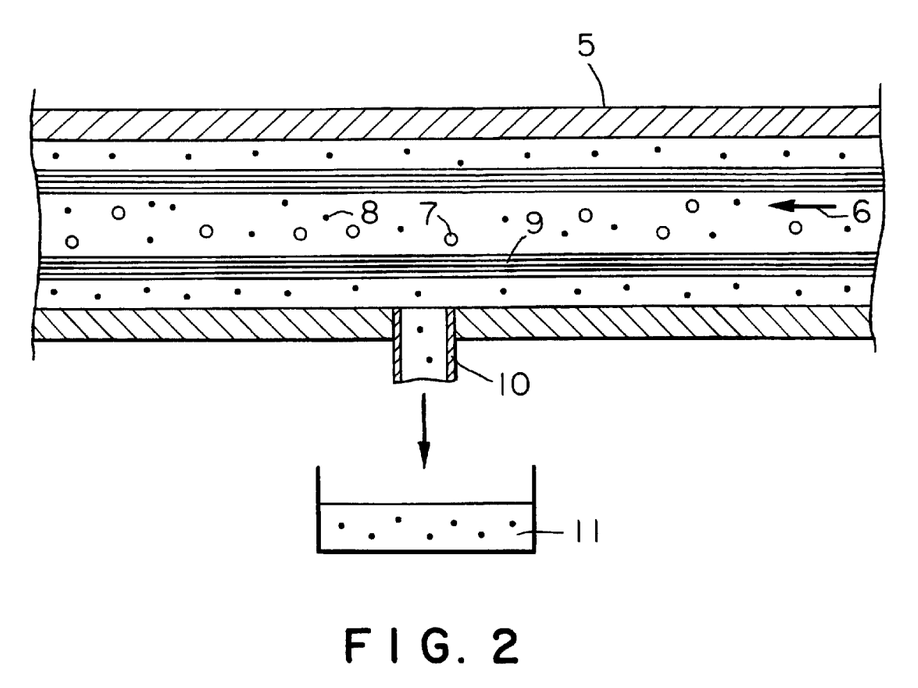
FIG. 2 is an enlarged view of a crossflow membrane filtration apparatus in its membrane filtration section.

The production process of a pigment dispersion according to the first aspect of the present invention will be described with reference to FIGS. 1 and 2. FIG. 1 shows a crossflow membrane filtration apparatus 1. In this apparatus, a stock pigment dispersion is introduced from a stock pigment dispersion reservoir 2 by means of a pressure pump 14 into a filtration membrane 9 in a filtration pipe through an injection port 4. Next, as shown in FIG. 2, the stock pigment dispersion is flowed in a direction indicated by an arrow 6, and pigments particles 7 and 8 are moved onto the surface of the filtration membrane 9. Since the inside of the filtration membrane 9 is increased pressure, the stock pigment dispersion is pressurized in a direction which crosses the filtration membrane 9. Further, the stock pigment dispersion, which flows parallel to the filtration membrane 9, always washes the surface of the filtration membrane to prevent the formation of a pigment cake or clogging of the filtration membrane. The stock pigment dispersion containing the pigment particles 8 having a size smaller than the average pore diameter of the filtration membrane 9 is passed through the filtration membrane 9, is passed through a discharge port 10, and is reservoired in a liquid reservoir 11. On the other hand, the liquid containing pigment particles 7 having a size larger than the average pore diameter of the filtration membrane 9 is sucked by an suction pump 12. This liquid is passed through a circulation pipe 13, and, together with the stock pigment dispersion, is again subjected to crossflow membrane filtration by means of the pressure pump 14.

According to the first aspect of the present invention, the desired pigment dispersion is either the liquid reservoired in the liquid reservoir 11 or the liquid remaining within the filtration membrane in the crossflow membrane filtration.

Membrane Filtration in Second and Third Aspects of Present Invention

The second and third aspects of the present invention provide production processes for producing a dispersion of a pigment having an average: particle diameter which has been regulated by first-stage crossflow membrane filtration and second-stage crossflow membrane filtration.

According to the second aspect of the present invention, the average pore diameter of the membrane in the first-stage crossflow membrane filtration is larger than the average pore diameter of the membrane in the second-stage crossflow membrane filtration. Therefore, when the stock pigment dispersion has been subjected to the first-stage crossflow membrane filtration, a liquid containing pigment particles having a size smaller than the average pore diameter of the filtration membrane is passed through the filtration membrane. The liquid, which is passed through the filtration membrane, is subjected to the second-stage crossflow membrane filtration. In the second-stage crossflow membrane filtration, a liquid containing pigment particles having a size smaller than the average pore diameter of the filtration membrane is passed through the filtration membrane, and is then discharged. On the other hand, a liquid containing pigment particles having a size larger than the average pore diameter of the filtration membrane is left within the filtration membrane. This liquid is a desired pigment dispersion.

In the second aspect of the present invention, the average pore diameter of the membrane in the first-stage crossflow membrane filtration is smaller than the average pore diameter of the membrane in the second-stage crossflow membrane filtration. Therefore, when the stock pigment dispersion is subjected to first-stage crossflow membrane filtration, a liquid containing pigment particles having a size larger than the average pore diameter of the filtration membrane is not passed through the filtration membrane, remains within the filtration membrane, and is recovered. When this liquid is subjected to the second-stage crossflow membrane filtration, pigment particles having a size larger than the average pore diameter of the filtration membrane are left within the filtration membrane, while a liquid containing pigment particles having a size smaller than the average pore diameter of the: filtration membrane is recovered as a desired pigment dispersion.

In the second and third aspects of the present invention, the average pore diameter of the membrane in the crossflow membrane filtration may be properly determined by taking into consideration the average particle diameter of the pigment to be regulated. In the second aspect of the present invention, the average pore diameter of the membrane in the first-stage crossflow membrane filtration is larger than the average pore diameter of the membrane in the second-stage crossflow membrane filtration. In this case, the average pore diameter of the membrane used in the first-stage crossflow membrane filtration is in the range of about 0.05 to 1 μm, preferably in the range of about 0.2 to 1 μm, and the average pore diameter of the membrane used in the second-stage crossflow membrane filtration is in the range of about 0.001 to 0.1 μm, preferably in the range of about 0.01 to 0.1 μm. The first-stage crossflow membrane filtration and the second-stage crossflow membrane filtration using these filtration membranes can provide a dispersion of a pigment having an average particle diameter which has been regulated so as to fall within the range of about 10 to 300 nm, preferably within the range of about 10 to 200 nm. In the third aspect of the present invention, the average pore diameter of the membrane in the first-stage crossflow membrane filtration is smaller than the average pore diameter of the membrane in the second-stage crossflow membrane filtration. That is, the third aspect of the present invention and the second aspect of the present invention are opposite to each other in the first-stage crossflow membrane filtration and the second-stage crossflow membrane filtration. Therefore, in the third aspect of the present invention, the average pore diameter of the membrane in the first-stage crossflow membrane filtration and the average pore diameter of the membrane in the second-stage crossflow membrane filtration may be the same as the average pore diameter of the membrane in the second-stage crossflow membrane filtration and the average pore diameter of the membrane in the first-stage crossflow membrane filtration which have been described above in connection with the second aspect of the present invention.

In the second and third aspects of the present invention, the time, pressure and the like for crossflow membrane filtration in the first-stage crossflow membrane filtration and the second-stage crossflow membrane filtration may be properly determined by taking into consideration, for example, the particle diameter and coagulation properties of the pigment to be filtered.

Figure 3:
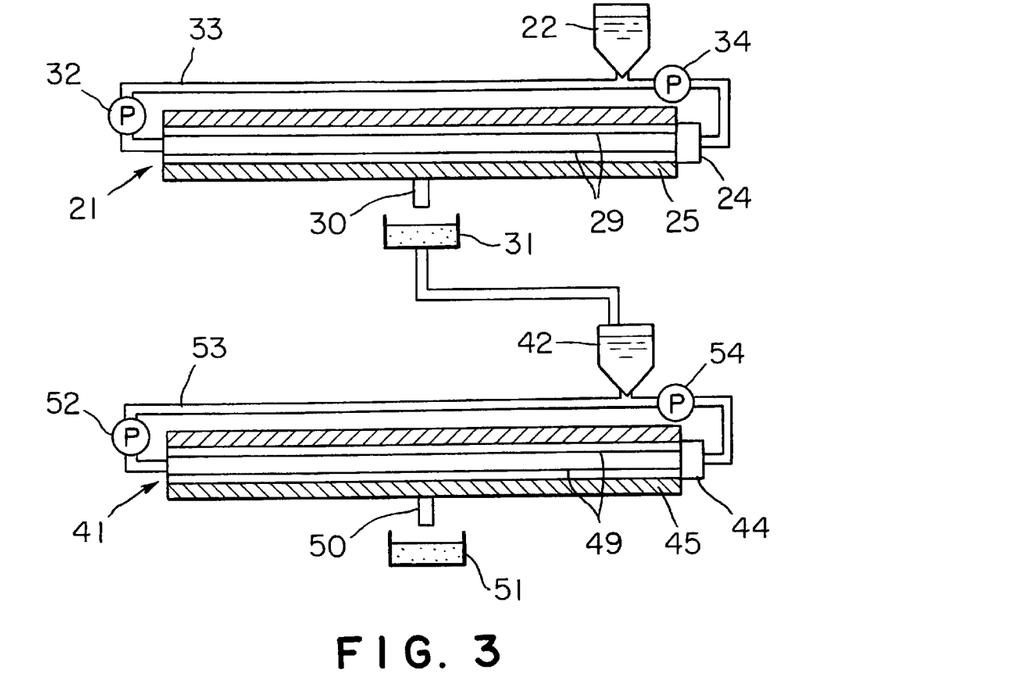
FIG. 3 is a schematic diagram showing an apparatus, capable of realizing the method according to the present invention, comprising a first-stage crossflow membrane filtration apparatus and a second-stage crossflow membrane filtration apparatus.
Figure 4:
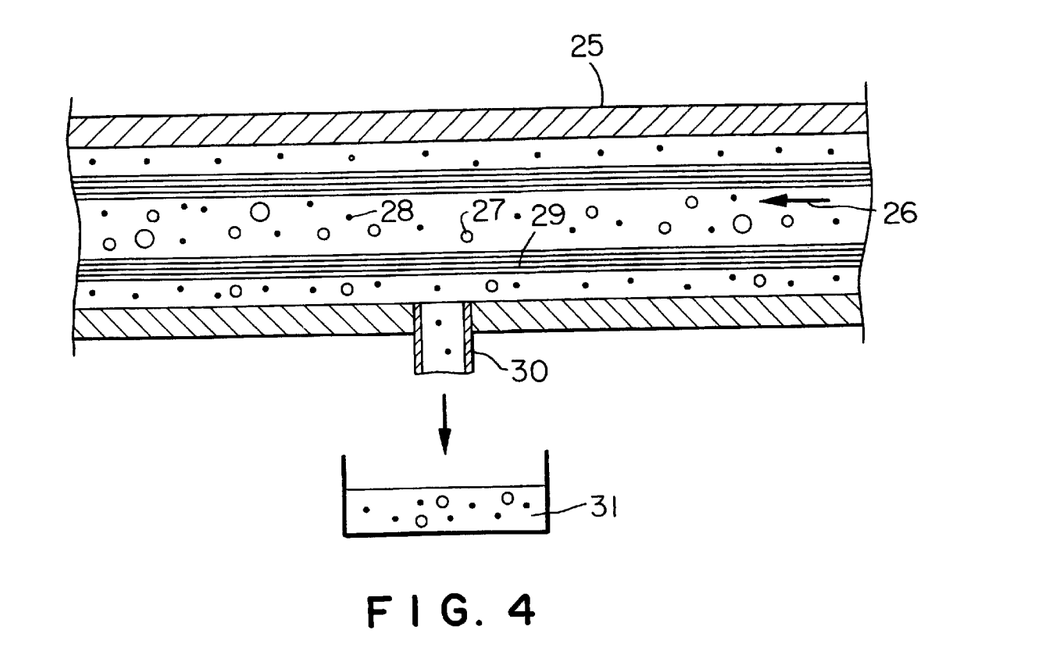
FIG. 4 is an enlarged view of a first-stage crossflow membrane filtration apparatus in its membrane filtration section.

The second aspect of the present invention will be described with reference to FIGS. 3, 4, and 5. FIG. 3 in its upper part shows a first-stage crossflow membrane filtration apparatus 21. In this apparatus 21, a stock pigment dispersion is introduced from a stock pigment dispersion reservoir 22 by means of a pressure pump 34 into a filtration membrane 29 in a filtration pipe 25 through an injection port 24. Next, as shown in FIG. 4 (an enlarged view of the apparatus 1 in its membrane filtration section), the stock pigment dispersion is flowed in a direction indicated by an arrow 26, and is moved onto the surface of the filtration membrane 29. Since the inside of the filtration membrane 29 is increased pressure, the stock pigment dispersion is pressurized in a direction which crosses the filtration membrane 29. Further, the stock pigment dispersion, which flows parallel to the filtration membrane 29, always washes the surface of the filtration membrane 29 to prevent the formation of a pigment cake or clogging of the filtration membrane. A liquid containing pigment particles 27 and 28 having a size smaller than the average pore diameter of the filtration membrane 29 is passed through the filtration membrane 29, is passed through a discharge port 30, and is reservoired in a liquid reservoir 31. Thereafter, this liquid is sent from the liquid reservoir 31 to a stock pigment dispersion reservoir 42 in :a second-stage cross flow membrane filtration apparatus 41 shown in FIG. 3 in its lower part. As shown in FIG. 3 in its upper part, large pigment particles, together with the remaining stock liquid, is sucked by means of a suction pump 32. The sucked liquid is passed through a circulation pipe 33, is introduced through a pressure pump 34 into the membrane for the first-stage crossflow membrane filtration and is again subjected to crossflow membrane filtration.

Figure 5:
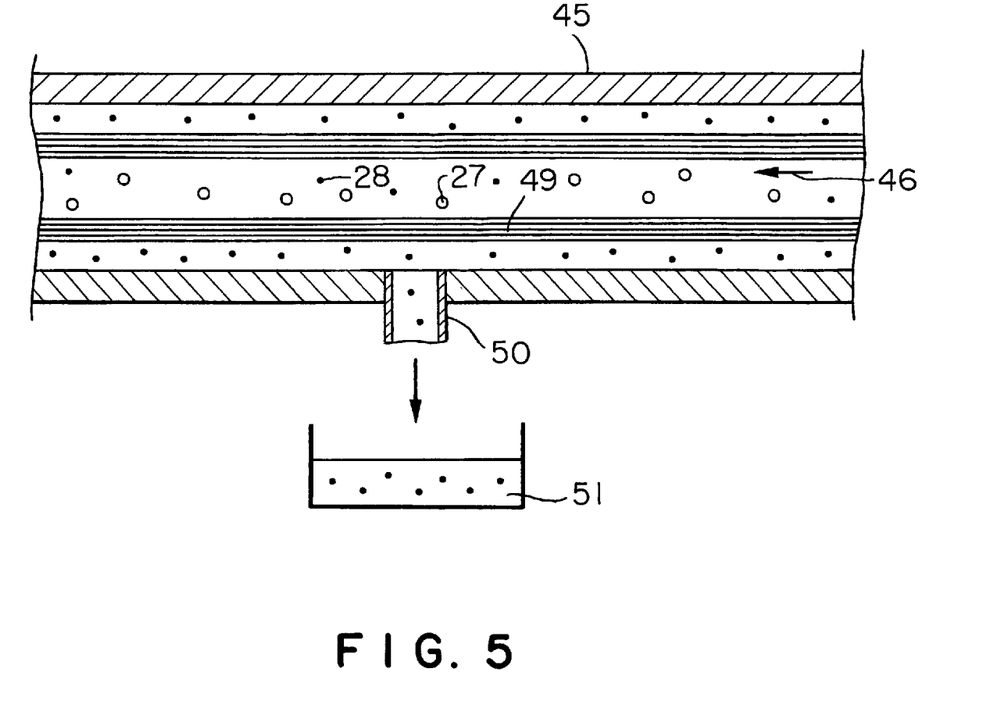
FIG. 5 is an enlarged view of a second-stage crossflow membrane filtration apparatus in its membrane filtration section.

FIG. 3 in its lower part shows the second-stage crossflow membrane filtration apparatus 41. In this apparatus, a stock pigment dispersion is introduced from a stock pigment dispersion reservoir 42 by means of a pressure pump 54 into a filtration membrane 49 in a filtration pipe 45 through an injection port 44. Next, as shown in FIG. 5 (an enlarged view of the apparatus 41 in its membrane filtration section), the stock pigment dispersion is flowed in a direction indicated by an arrow 46, and is moved onto the surface of the filtration membrane 49. Since the inside of the filtration membrane 49 has increased pressure, the stock pigment dispersion is pressurized in a direction which crosses the filtration membrane 49. Further, the stock pigment dispersion, which flows parallel to the filtration membrane 49, always washes the surface of the filtration membrane 49 to prevent the formation of a pigment cake or clogging of the filtration membrane. A liquid containing pigment particles 28 having, a size smaller than the average pore diameter of the filtration membrane 49 is passed through the filtration membrane 49, is passed through a discharge port 50, is reservoired in a liquid reservoir 51, and is discharged. As shown in FIG. 3 in its lower part, the stock pigment dispersion in its portion containing pigment particles 27 having a size larger than the average pore diameter of the filtration membrane 49 is sucked by means of a suction pump 52. The sucked liquid is passed through a circulation pipe 53, is introduced through a pressure pump 54 into the membrane for the second-stage crossflow membrane filtration and is again subjected to crossflow membrane filtration. When the absence of pigment particles 28 in the liquid reservoir 51 is confirmed, the second-stage crossflow filtration apparatus 41 is stopped. A liquid containing the pigment particles 27, which are present within the circulation path, is recovered. The recovered liquid is the desired pigment dispersion.

In the third aspect of the present invention, the second-stage crossflow membrane filtration apparatus 41 shown in FIG. 3 in its lower part functions as the first-stage crossflow membrane filtration apparatus, and the first-stage crossflow membrane filtration apparatus 21 shown in FIG. 3 in its upper part functions as the second-stage crossflow membrane filtration apparatus to prepare the desired pigment dispersion (specific procedure is not shown in FIG. 3).

c) Pigment

The pigment utilized in the production process of the pigment dispersion according to the present invention is not particularly limited, and any of inorganic pigments and organic pigments may be used. Inorganic pigments usable herein include, in addition to titanium oxide and iron oxide, carbon blacks produced by conventional processes, such as contact, furnace, and thermal processes. Organic pigments usable herein include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye-type chelate pigments (for example, basic dye-type chelate pigments and acid dye-type chelate pigments), nitro pigments, nitroso pigments, and aniline black.

Carbon blacks usable for black inks include: carbon blacks manufactured by Mitsubishi Chemical Corporation, for example, No. 2300, No. 900, MCF 88, No. 33, No. 40, No. 45, No. 52, MA 7, MA 8, MA 100, and No. 2200 B; carbon blacks manufactured by Columbian Carbon Co., Ltd., for example, Raven 5750, Raven 5250, Raven 5000, Raven 3500, Raven 1255, and Raven 700; carbon blacks manufactured by Cabot Corporation, for example, Regal 400 R, Regal 330 R, Regal 660 R, MogulL, Monarch 700, Monarch 800, Monarch 880, Monarch 900, Monarch 1000, Monarch 1100, Monarch 1300, and Monarch 1400; and carbon blacks manufactured by Degussa, for example, Color Black FW 1, Color Black FW 2, Color Black FW 2 V, Color Black FW 18, Color Black FW 200, Color Black S 150, Color Black S 160, Color Black S 170, Printex 35, Printex U, Printex V, Printex 140 U, Special Black 6, Special Black 5, Special Black 4 A, and Special Black 4.

Pigments usable for yellow inks include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14 C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 180, and C.I. Pigment Yellow 185.

Pigments usable for magenta inks include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57 : 1, C.I. Pigment Red 112, C.I. Pigment Red 122, C.I. Pigment Red 123, C.I. Pigment Red 168, C.I. Pigment Red 184, and C.I. Pigment Red 202.

Pigments usable for cyan inks include C.I. Pigment Blue 1, C.I. Pigment Blue 2, C.I. Pigment Blue 3, C.I. Pigment Blue 15 : 3, C.I. Pigment:Blue 15 : 34, C.I. Pigment Blue 16, C.I. Pigment Blue 22, C.I. Pigment Blue 60, C.I. Vat Blue 4, and C.I. Vat Blue 60.

d) Solvent

According to the present invention, a pigment is dispersed in a solvent to prepare a stock pigment dispersion. Solvents usable in the present invention include polymeric dispersants, surfactants, water, and a combination of the above solvents. If necessary, water-soluble organic solvents and other ingredients added to the ink composition described below may be further added. According to a preferred embodiment of the present invention, the pigment, together with a polymeric dispersant or a surfactant, is dispersed to prepare a stock pigment dispersion.

Polymeric Dispersant

Examples of preferred polymeric dispersants include naturally occurring polymers, and specific examples thereof include: proteins, such as glue, gelatin, casein, and albumin; naturally occurring rubbers, such as gum arabic and tragacanth; glucosides, such as saponin; alginic acid and alginic acid derivatives, such as propylene glycol alginate, triethanolamine alginate, and ammonium alginate; and cellulose derivatives, such as methylcellulose, carboxymethylcellulose, hydroxyethylcellulose, and ethylhydroxycellulose. Examples of additional preferred polymeric dispersants include synthetic polymers, and examples thereof include: polyvinyl alcohols; polyvinyl pyrrolidones; acrylic resins, such as polyacrylic acid, acrylic acid/ acrylonitrile copolymer, potassium acrylate/acrylonitrile copolymer, vinyl acetate/acrylic ester copolymer, and acrylic acid/acrylic ester copolymer; styrene/acryl resins, such as styrene/acrylic acid copolymer, styrene/methacrylic acid copolymer, styrene/methacrylic acid/acrylic ester copolymer, styrene/α-methylstyrene/acrylic acid copolymer, and styrene/α-methylstyrene/acrylic acid/acrylic ester copolymer; styrene/maleic acid copolymer; styrene/ maleic anhydride copolymer; vinylnaphthalene/acrylic acid copolymer; vinylnaphthalene/maleic acid copolymer; vinyl acetate copolymers, such as vinyl acetate/ethylene copolymer, vinyl acetate/fatty acid vinylethylene copolymer, vinyl acetate/maleic ester copolymer, vinyl acetate/crotonic acid copolymer, and vinyl acetate/acrylic acid copolymer; and salts of the above polymers. Among them, a copolymer of a monomer having a hydrophobic group in its molecular structure with a monomer having a hydrophilic group in its molecular structure and a polymer of a monomer having both a hydrophobic group and a hydrophilic group in its molecular structure are particularly preferred.

Surfactant

Specific examples of surfactants include: anionic surfactants, such as sodium dodecylbenzenesulfonate, sodium laurylate, and ammonium saltlof polyoxyethylene alkyl ether sulfates; nonionic surfactants, such as polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamides; and amphoteriic surfactants, such as N,N-dimethyl-N-alkyl-N-carboxymethylammonium betaine, N,N-dialkylaminoalkylenecarbonxylates, N,N,N-trialkyl-N-sulfoalkyleneammonium betaine, N,N-dialkyl-N,N-bispolyoxyethyleneammoniumsulfonic ester betaine, and 2-alkyl-1-carboxymethyl-1-hydroxyethylimidazoliniumbetaine. They may be used alone or in combination of two or more.

According to a preferred embodiment of the present invention, a glycol ether and/or an acetylene glycol surfactant are further incorporated. Specific examples of glycol ethers usable herein include ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol monomethyl ether, dipropylene glycol monoethyl ether, dipropylenel glycol mono-n-propyl ether, and dipropylene glycol mono-iso-propyl ether. They may be used alone or as a mixture of two or more.

In the present invention, preferably, an acetylene glycol surfactant is further incorporated. Specific examples of preferred acetylene glycol surfactants usable in the present invention include compounds represented by formula (I):

wherein
$0 \leq m+n \leq 50$; and $R^1$, $R^2$, $R^3$, and $R^4$ each independently represent an alkyl group, preferably an alkyl group having 6 or less carbon atoms.

Among the compounds represented by formula (I), particularly preferred compounds include 2,4,7,9-tetramethyl-5-decyne-4,7-diol, 3,6-dimethyl-4-octyne-3,6-diol, and 3,5-dimethyl-1-hexyn-3-ol. Commercially available products may also be used as the acetylene glycol surfactants represented by formula (I). Specific examples thereof include Surfynol 104, Surfynol 82, Surfynol 465, Surfynol 485, and Surfynol TG (all the above products being available from Air Products and Chemicals Inc.) and OLFINE STG and OLFINE E 1010 (tradenames: manufactured by Nissin Chemical Industry Co., Ltd.).

Production Process of Ink Composition

The pigment dispersion produced by the production process according to the present invention, together with a water-soluble organic solvent, water and the like, may be mixed together to prepare an ink composition. This ink composition is preferably used in ink jet recording.

According to further aspects of the present invention, there are provided processes for producing an ink composition comprising at least a pigment, a dispersant, and a water-soluble organic solvent.

Specifically, according to a fourth aspect of the present invention, there is provided a process for producing an ink composition comprising at least a pigment, a dispersant, and a water-soluble organic solvent, said process comprising the steps of:

preparing a stock ink comprising at least a pigment, a dispersant, and a water-soluble organic solvent; and subjecting the stock ink to crossflow membrane filtration to recover a liquid, which is passed through the filtration membrane, or a liquid, which is not passed through the filtration membrane, as an ink composition.

According to a fifth aspect of the present invention, there is provided a process for producing an ink composition comprising at least a pigment, a dispersant, and a water-soluble organic solvent, said process comprising the steps of:

preparing a stock ink comprising at least a pigment, a dispersant, and a water-soluble organic solvent;

subjecting the stock ink to first-stage crossflow membrane filtration to recover a liquid which is passed through the filtration membrane; and subjecting said liquid to second-stage crossflow membrane filtration to recover a liquid, which is not passed through the filtration membrane, as an ink composition, the average pore diameter of the membrane used in the first-stage crossflow membrane filtration being larger than the average pore diameter of the membrane used in the second-stage crossflow membrane filtration.

According to a sixth aspect of the present invention, there is provided a process for producing an ink composition comprising at least a pigment, a dispersant, and a water-soluble organic solvent, said process comprising the steps of:

preparing a stock ink comprising at least a pigment, a dispersant, and a water-soluble organic solvent;

subjecting the stock ink to first-stage crossflow membrane filtration to recover a liquid which is not passed through the filtration membrane; and subjecting said liquid to second-stage crossflow membrane filtration to recover a liquid, which is passed through the filtration membrane, as an ink composition, the average pore diameter of the membrane used in the first-stage crossflow membrane filtration being smaller than the average pore diameter of the membrane used in the second-stage crossflow membrane filtration.

a) Preparation of Stock Ink, Crossflow Membrane Filtration, Pigment, and Dispersant In the production processes of an ink composition according to the present invention, the stock ink comprising at least a pigment, a dispersant, and a water-soluble organic solvent may be prepared in the same manner as described above in connection with the preparation of the stock pigment dispersion in the production process of the pigment dispersion. Therefore, the pigment and the dispersant may also be the same as those described above in connection with the preparation of the stock dispersion of the pigment. Further, the crossflow membrane filtration technique may also be the same as that described above in connection with the production process of the pigment dispersion.

According to the present invention, the content of the pigment is in the range of about 0.1 to 10% by weight, preferably in the range of about 1 to 5% by weight, based on the total amount of the ink composition. The content of the dispersant is in the range of about 0.01 to 1.5% by weight, preferably in the range of about 0.1 to 1% by weight, based on the total weight of the pigment dispersion.

b) Water-soluble Organic Solvent

The water-soluble organic solvent utilizable in the present invention preferably contains a wetting agent comprising a high-boiling organic solvent. Examples of preferred high-boiling organic solvents include: polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; 2-pyrrolidone and N-methyl-2-pyrrolidone; 1,3-dimethyl-2-imidazolidinone; and triethanolamine.

Among them, the utilization of water-soluble organic solvents having a boiling point of 180° C. or above is preferred. The use of water-soluble organic solvents having a boiling point of 180° C. or above can impart water retention and wetting properties to the ink composition. As a result, the storage of the ink composition for a long period of time neither causes coagulation of pigment nor an increase in the viscosity of the ink composition. Thus, excellent storage stability can be realized. Further, an ink composition can be realized which, even when allowed to stand in an open state, that is, when allowed to stand in contact with air at room temperature, can maintain the fluidity and the redispersibility for a long period of time, and, in addition, when used in ink jet recording, does not cause clogging of nozzles during printing or at the time of restarting after interruption of printing, thus offering high ejection stability.

Examples of water-soluble organic solvents having a boiling point of 180° C. or above include ethylene glycol (b.p.: 197° C.; the boiling point being hereinafter described within parentheses), propylene glycol (187° C.), diethylene glycol (245° C.), pentamethylene glycol (242° C.), trimethylene glycol (214° C.), 2-butene-1,4-diol (235° C.), 2-ethyl-1,3-hexanediol (243° C.), 2-methyl-2,4-pentanediol (197° C.), N-methyl-2-pyrrolidone (202° C.), 1,3-dimethyl-2-imidazolidinone (257–260° C.), 2-pyrrolidone (245° C.), glycerin (290° C.), tripropylene glycol monomethyl ether (243° C.), dipropylene glycol monoethyl glycol (198° C.), dipropylene glycol monomethyl ether (190° C.), dipropylene glycol (232° C.), triethylene glycol monomethyl ether (249° C.), tetraethylene glycol (327° C.), triethylene glycol (288° C.), diethylene glycol monobutyl ether (230° C.), diethylene glycol monoethyl ether (202° C.), and diethylene glycol monomethyl ether (194° C.). Among these water-soluble organic solvents, those having a boiling point of 200° C. or above are preferred. These water-soluble organic solvents may be used alone or as a mixture of two or more.

The content of the high-boiling organic solvent is preferably about 0.01 to 10% by weight, more preferably about 0.1 to 5% by weight, based on the total amount of the ink composition.

Water-soluble organic solvents usable herein include tertiary amines. The addition of tertiary amines can impart wetting properties to the ink composition. Specific examples of tertiary amines include trimethylamine, triethylamine, triethanolamine, dimethylethanolamine, diethylethanolamine, triisopropenolamine, and butyldiethanolamine. They may be used alone or as a mixture of two or more. The amount of the tertiary amine added to the ink composition is preferably about 0.1 to 10% by weight, more preferably about 0.5 to 5% by weight, based on the total amount of the ink composition.

c) Water and Other Ingredients

In the production processes of an ink composition according to the present invention, in addition to the above ingredients, water and other ingredients may be added to produce the ink composition.

Specific examples of other ingredients include alkali hydroxides, and examples thereof include potassium hydroxide, sodium hydroxide, and lithium hydroxide. The amount of the alkali hydroxide added is preferably about 0.01 to 5% by weight, more preferably about 0.05 to 3% by weight, based on the total amount of the ink composition.

Additional other ingredients include surfactants. Specific examples thereof include: anionic surfactants, such as sodium dodecylbenzenesulfonate, sodium laurylate, and ammonium salt of polyoxyethylene alkyl ether sulfates; nonionic surfactants, such as polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamides; and amphoteric surfactants, such as N,N-dimethyl-N-alkyl-N-carboxymethylammonium betaine, N,N-dialkylaminoalkylenecarbonxylates, N,N,N-trialkyl-N-sulfoalkyleneammonium betaine, N,N-dialkyl-N,N-bispolyoxyethyleneammoniumsulfonic ester betaine, and 2-alkyl-1-carboxymethyl-1-hydroxyethylimidazolinium betaine. They may be used alone or in combination of two or more.

The amount of the surfactant added is about 0.01 to 10% by weight, preferably about 0.1 to 5% by weight, based on the total amount of the ink composition.

According to a preferred embodiment of the present invention, glycol ether and/or acetylene glycol surfactants may be further added to prepare an ink composition.

Glycol ethers utilizable in the present invention are those which may also be used as the water-soluble organic solvent, and specific examples thereof include ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol monomethyl ether, dipropylene glycol monoethyl ether, dipropylene glycol mono-n-propyl ether, and dipropylene glycol mono-iso-propyl ether. They may be used alone or as a mixture of two or more.

According to the present invention, preferably, an acetylene glycol surfactant is added to prepare an ink composition. The addition of the acetylene glycol surfactant can enhance the penetration of the ink composition into recording media and can be expected to realize prints having a reduced level of feathering or bleeding on various recording media. Specific examples of preferred acetylene glycol surfactants usable in the present invention include compounds represented by formula (I):

wherein
$0 \leq m+n \leq 50$; and
$R^1$, $R^2$, $R^3$, and $R^4$ each independently represent an alkyl group, preferably an alkyl group having 6 or less carbon atoms.

Among the compounds represented by formula (I), particularly preferred compounds include 2,4,7,9-tetramethyl-5-decyne-4,7-diol, 3,6-dimethyl-4-octyne-3,6-diol, and 3,5-dimethyl-1-hexyn-3-ol. Commercially available products may also be used as the acetylene glycol surfactants represented by formula (I). Specific examples thereof include Surfynol 104, Surfynol 82, Surfynol 465, Surfynol 485, and Surfynol TG (all the above products being available from Air Products and Chemicals Inc.) and OLFINE STG and OLFINE E 1010 (tradenames: manufactured by Nissin Chemical Industry Co., Ltd.). The amount of the surfactant added is preferably about 0.01 to 10% by weight, more preferably about 0.1 to 5% by weight, based on the total amount of the ink composition.

According to the present invention, preferably a saccharaide or a saccharide derivative may be added to produce an ink composition. The addition of the saccharide or the saccharide derivative imparts water retention properties to the ink composition. In particular, the use of the saccharide or the saccharide derivative in combination with a salt or a derivative of hyaluronic acid can impart significant water retention properties to the ink composition.

Examples of saccharides include monosaccharides, disaccharides, oligosaccharides (including trisaccharides and tetrasaccharides), and polysaccharides, and preferred examples thereof include glucose, mannose, fructose, ribose, xylose, arabinose, galactose, aldonic acid, glucitol, sorbit, maltose, cellobiose, lactose, sucrose, trehalose, and maltotriose. The polysaccharides refer to saccharides in a wide sense and embrace materials which widely exist in the natural world, such as alginic acid, α-cyclodextrin, and cellulose. Derivatives of these saccharides include reducing sugars of the above saccharides (for example, sugar alcohols represented by the general formula $HOCH_2(CHOH)_n CH_2OH$ wherein n is an integer of 2 to 5), oxidized sugars (for example, aldonic acid and uronic acid), amino acid, and thiosugars. Sugar alcohols are particularly preferred, and specific examples thereof include maltitol and sorbit. The content of the saccharide or the saccharide derivative is preferably about 0.1 to 40% by weight, more preferably about 2.5 to 20% by weight, based on the total amount of the ink composition.

According to the present invention, glycerin is preferably added to produce an ink composition. The addition of glycerin can effectively prevent the ink composition from drying at the front face of nozzles in a recording head and thus can prevent nozzle clogging. The amount of glycerin added is about 5 to 40% by weight, preferably about 10 to 20% by weight, based on the total amount of the ink composition.

According to the present invention, in the production of an ink composition, for example, nozzle clogging preventives, preservatives, antimolds, antioxidants, electric conductivity adjustors, pH adjustors, viscosity modifiers, surface tension modifiers, and oxygen absorbers may be added.

Examples of preservatives or antimolds include sodium benzoate, pentachlorophenol sodium, 2-pyridinethiol-1-oxide sodium, sodium sorbate, sodium dehydroacetate, and 1,2-dibenzothiazolin-3-one (Proxel CRL, Proxel BDN, Proxel GXL, Proxel XL-2, and Proxel TN, manufactured by ICI).

EXAMPLES

The following examples further illustrate the present invention, but should not be construed as limiting the scope of the present invention. The numerical values in the table are by % by weight unless otherwise specified.

Production of Ink Compositions: Part A1
Production of Pigment Dispersions: Part A Ingredients indicated in Table A1 below, together with glass beads (diameter: 1.7 mm, amount: 1.5 times (by weight) larger than the mixture), were mixed and dispersed for 2 hr in a sand mill (manufactured by Yasukawa Seisakusho) to prepare stock pigment dispersions. Thereafter, for each stock pigment dispersion, the half amount of the stock pigment dispersion was filtered by crossflow membrane filtration wherein the membrane filtration was ultrafiltration using a membrane having an effective pore diameter of 0.5 μm to prepare pigment dispersions. The remaining half amount of each of the stock pigment dispersions as such was used as pigment dispersions without the crossflow membrane filtration.

TABLE A1

|  | Example A1/Comparative Example A1 | Example A2/Comparative Example A2 | Example A3/Comparative Example A3 | Example A4/Comparative Example A4 |
| --- | --- | --- | --- | --- |
| Pigment component: | | | | |
| C.I. Pigment Blue 15:3 | 15 | | | |
| C.I. Pigment Red 122 | | 15 | | |
| C.I. Pigment Yellow 128 | | | 18 | |
| Carbon black | | | | 20 |
| Water-soluble resin (dispersant) | 7.0 | 9.0 | 11 | 12 |
| Ethylene glycol | 10 | 10 | 10 | 10 |
| Pure water | Balance | Balance | Balance | Balance |

Water-soluble resin: Styrene-acrylic acid copolymer (molecular weight 18000, acid value 120)

Ingredients indicated in Table A2 below were mixed together, and the mixtures were stirred at room temperature for 20 min. Thus, ink compositions of Examples A1 to A4 and Comparative Examples A1 to A4 were prepared.

TABLE A2

| | |
|---|---|
| Pigment dispersion | 20 wt % |
| Glycerin | 10 wt % |
| Triethylene glycol monobutyl ether | 8 wt % |
| Surfynol 465 | 1 wt % |
| Pure water | Balance |

Note) Pigment dispersion: produced in Part A in production of pigment dispersions Production of Ink Compositions: Part A2

Ingredients indicated in Table A3 below, together with glass beads (diameter: 1.7 mm, amount: 1.5 times (by weight) larger than the mixture), were mixed and dispersed for 2 hr in a sand mill (manufactured by Yasukawa Seisakusho) to prepare stock inks. Thereafter, for each stock ink, the half amount of the stock ink was filtered by crossflow membrane filtration wherein the membrane filtration was ultrafiltration using a membrane having a fractionation effective pore diameter of 0.5 μm. Thus, ink compositions of Examples A5 to A8 were prepared. The remaining half amount of each of the stock inks was filtered under pressure through a cartridge filter using a polypropylene filtration membrane with an effective pore diameter of 0.5 μm under a pressure of 0.8 kg/cm². Thus, ink compositions of Comparative Examples A5 to A8 were prepared.

TABLE A3

| | Example A5/Comparative Example A5 | Example A6/Comparative Example A6 | Example A7/Comparative Example A7 | Example A8/Comparative Example A8 |
|---|---|---|---|---|
| Pigment component: | | | | |
| C.I. Pigment Blue 15:3 | 2.0 | | | |
| C.I. Pigment Red 122 | | 3.0 | | |
| C.I. Pigment Yellow 128 | | | 3.5 | |
| Carbon black | | | | 3.5 |
| Water-soluble resin (dispersant) | 0.7 | 1.1 | 1.5 | 1.4 |
| Glycerin | 10 | 10 | 10 | 10 |
| Ethylene glycol | 8 | 10 | 5 | 4 |
| 2-Pyrrolidone | 4 | 2 | 1 | — |
| Triethylene glycol mono-butyl ether | 2 | 5 | 5 | 10 |
| Surfynol 465 | 1 | 1.1 | 0.7 | 0.5 |
| Pure water | Balance | Balance | Balance | Balance |

Particle Diameter of Pigments in Ink Compositions: Part A

The particle diameters of pigments in the ink compositions of Examples of A1 to A8 and Comparative Examples A1 to A8 were as summarized in Table A4 below.

TABLE A4

| Ink composition | Color | Average particle diameter, nm | Maximum particle diameter, nm |
|---|---|---|---|
| Example A1 | Cyan | 93 | 204 |
| Example A2 | Magenta | 88 | 204 |
| Example A3 | Yellow | 85 | 204 |
| Example A4 | Black | 99 | 204 |
| Example A5 | Cyan | 93 | 204 |
| Example A6 | Magenta | 88 | 204 |
| Example A7 | Yellow | 85 | 204 |

TABLE A4-continued

| Ink composition | Color | Average particle diameter, nm | Maximum particle diameter, nm |
|---|---|---|---|
| Example A8 | Black | 99 | 204 |
| Comparative Example A1 | Cyan | 98 | 408 |
| Comparative Example A2 | Magenta | 101 | 408 |
| Comparative Example A3 | Yellow | 99 | 344 |
| Comparative Example A4 | Black | 99 | 408 |
| Comparative Example A5 | Cyan | 93 | 344 |
| Comparative Example A6 | Magenta | 88 | 408 |
| Comparative Example A7 | Yellow | 85 | 289 |
| Comparative Example A8 | Black | 99 | 344 |

Note:
1) For Examples A1 to A4, the crossflow membrane filtration was carried out after the production of the stock pigment dispersions.
2) For Examples A5 to A8, the crossflow membrane filtration was carried out after the production of the ink compositions.
3) For Comparative Examples A1 to A4, the crossflow membrane filtration was not carried out after the production of stock pigment dispersions.
4) For Comparative Examples A5 to A8, the filtration was carried out through a cartridge filter after the production of the ink compositions.

Evaluation Test A

Evaluation A1: Filtrability

Each ink composition (200 liters) of Examples A5 to A8 and Comparative Examples A5 to A8 was filtered under pressure. In the filtration, the initial value of the flow rate was set to 5 liters per min. In this case, the filtrability was evaluated in terms of the flow rate loss caused in a period between the early stage of the filtration and the end of the filtration according to the following criteria. The results were as described in Table A5 below. The results show that lower flow rate loss could provide pigments having a more desired average particle diameter.

Evaluation Criteria

A: Frow rate loss of less than 10%
B: Frow rate loss of not less than 10% and less than 30%
C: Frow rate loss of not less than 30% and less than 50%
D: Frow rate loss of more than 50%

Evaluation A2: Printing stability

An ink jet printer EM-900C manufactured by Seiko Epson Corporation was filled with each of the ink compositions of Examples A1 to A8 and Comparative Examples A1 to A8, followed by printing on a specialty recording medium for ink jet recording (a specialty gloss film, manufactured by Seiko Epson Corporation). The amount of ink ejected was 0.040 μg per 1/360 dpi, and the resolution was 360×360 dpi. Continuous printing was carried out by the printer under conditions of temperature 40° C. and humidity 30% for a long period of time, and the prints were evaluated for dropouts of dots and scattering of ink according to the following criteria. The results were: as described in Table A5 below.

Evaluation Criteria

A: The number of times of dropouts of dots or scattering of ink 96 hr after the start of the printing was less than ten.
B: The number of times of dropouts of dots or scattering of ink was less than ten, 72 hr after the start of the printing, and was ten or more, 96 hr after the start of the printing.
C: The number of times of dropouts of dots or scattering of ink was less than ten, 48 hr after the start of the printing, and was ten or more, 72 hr after the start of the printing.
D: The number of times of dropouts of dots or scattering of ink was less than ten, 24 hr after the start of the printing, and was ten or more, 48 hr after the start of the printing.

E: The number of times of dropouts of dots or scattering of ink was ten or more within 24 hr from the start of the printing.

TABLE A5

|  | Evaluation A1 | Evaluation A2 |
|---|---|---|
| Example A1 |  | A |
| Example A2 |  | A |
| Example A3 |  | A |
| Example A4 |  | A |
| Example A5 | A | A |
| Example A6 | A | A |
| Example A7 | A | A |
| Example A8 | A | A |
| Comparative Example A1 |  | C |
| Comparative Example A2 |  | D |
| Comparative Example A3 |  | D |
| Comparative Example A4 |  | C |
| Comparative Example A5 | C | C |
| Comparative Example A6 | C | C |
| Comparative Example A7 | C | C |
| Comparative Example A8 | C | D |

Production of Ink Compositions: Part B

Production of pigment dispersions: Part B

Ingredients indicated in Table B1 below, together with glass beads (diameter: 1.7 mm, amount: 1.5 times (by weight) larger than the mixture), were mixed and dispersed for 2 hr in a sand mill (manufactured by Yasukawa Seisakusho) to prepare stock pigment dispersions. Thereafter, for each stock pigment dispersion, the half amount of the stock pigment dispersion was filtered by the following crossflow membrane filtration to prepare pigment dispersions. The remaining half amount of each of the stock pigment dispersions as such was used as pigment dispersions without the crossflow membrane filtration.

Crossflow Membrane Filtration (1) First-stage cross flow membrane filtration

Each of the stock pigment dispersions (200 liters) thus obtained was filtered by first-stage crossflow membrane filtration wherein the membrane filtration was carried out by ultrafiltration and the filtration membrane had a fractionation effective pore diameter of 0.5 $\mu$m. The liquid, which had been passed through the membrane, was recovered. In a first-stage crossflow membrane filtration apparatus, the output of the pump and the pressure within the passage were prepared so that the flow rate of circulation was 20 liters per min and the flow rate on the permeation side was 0.5 liter per min in an early stage of the operation.

(2) Second-stage Crossflow Ultrafiltration

The liquid recovered in the item (1) was filtered by second-stage crossflow membrane filtration wherein the membrane filtration was carried out by ultrafiltration and the filtration membrane had a fractionation effective pore diameter of 0.01 $\mu$m. The liquid, which had not been passed through the membrane, was recovered as a pigment dispersion. In a second-stage crossflow:membrane filtration apparatus, the output of the pump and the pressure within the passage were regulated so that the flow rate of circulation was 20 liters per min and the flow rate on the permeation side was 0.01 liter per min in an early stage of the operation.

The amount of the pigment dispersions thus obtained was about 180 liters independently of the type of the pigment.

TABLE B1

|  | Example B1/Comparative Example B1 | Example B2/Comparative Example B2 | Example B3/Comparative Example B3 | Example B4/Comparative Example B4 |
|---|---|---|---|---|
| Pigment component: |  |  |  |  |
| C.I. Pigment Blue 15:3 | 15 |  |  |  |
| C.I. Pigment Red 122 |  | 15 |  |  |
| C.I. Pigment Yellow 128 |  |  | 18 |  |
| Carbon black |  |  |  | 20 |
| Water-soluble resin (dispersant) | 7.0 | 9.0 | 11 | 12 |
| Ethylene glycol | 10 | 10 | 10 | 10 |
| Pure water | Balance | Balance | Balance | Balance |

Water-soluble resin: Styrene-acrylic acid copolymer (molecular weight 18000, acid value 120)

Production of Ink Compositions: Part B1

Ingredients indicated in Table B2 below were mixed together, and the mixtures were stirred at room temperature for 20 min. Thus, ink compositions of Examples B1 to B4 and Comparative Examples B1 to B4 were prepared.

TABLE B2

| Pigment dispersion | 20 wt % |
|---|---|
| Glycerin | 10 wt % |
| Triethylene glycol monobutyl ether | 8 wt % |
| Surfynol 465 | 1 wt % |
| Pure water | Balance |

Note) Pigment dispersion: produced in Part B in production of pigment dispersion Production of Ink Compositions: Part B2

Ingredients indicated in Table B3 below were mixed together, and the mixture, together with glass beads (diameter: 1.7 mm, amount: 1.5 times (by weight) larger than the mixture), was dispersed for 2 hr in a sand mill (manufactured by Yasukawa Seisakusho) to prepare stock inks. Thereafter, for each of the stock inks thus obtained, the half amount of the stock ink was filtered by the following crossflow membrane filtration. Thus, ink compositions of Examples B5 to B8 were prepared. The remaining half amount of each of the stock inks was filtered through a cartridge filter using a polypropylene filtration membrane with an effective pore diameter of 0.5 $\mu$m under a pressure of 0.8 kg/cm$^2$. Thus, ink compositions of Comparative Examples B5 to B8 were prepared.

Crossflow Membrane Filtration (1) First-stage Crossflow Membrane Filtration

Each of the stock inks thus obtained (200 liters) was filtered by first-stage crossflow membrane filtration wherein the membrane filtration was carried out by ultrafiltration and the filtration membrane had a fractionation effective pore diameter of 0.5 $\mu$m. The liquid, which had been passed through the filtration membrane, was recovered. In the first-stage cross flow membrane filtration, the output of the pump and the pressure within the passage were prepared so that the flow rate of circulation was 20 liters per min and the flow rate on the permeation side was 0.5 liter per min in an early stage of the operation.

(2) Second-stage Crossflow Filtration

The liquid recovered in the item (1) was then filtered by second-stage crossflow membrane filtration wherein the membrane filtration was carried out by ultrafiltration and the filtration membrane had a fractionation effective pore diameter of 0.01 $\mu$m. The liquid, which had not been passed through the filtration membrane, was recovered as an ink composition. In the second-stage crossflow membrane filtration, the output of the pump and the pressure within the passage were regulated so that the flow rate of circulation was 20 liters per min and the flow rate on the permeation side was 0.01 liter per min in an early stage of the operation.

The amount of the ink compositions thus obtained was about 180 liters independently of the type of the pigment.

TABLE B3

|  | Cyan | Magenta | Yellow | Black |
|---|---|---|---|---|
| Pigment component: | | | | |
| C.I. Pigment Blue 15:3 | 2.0 | | | |
| C.I. Pigment Red 122 | | 3.0 | | |
| C.I. Pigment Yellow 128 | | | 3.5 | |
| Carbon black | | | | 3.5 |
| Water-soluble resin (dispersant) | 0.7 | 1.1 | 1.5 | 1.4 |
| Glycerin | 10 | 10 | 10 | 10 |
| Ethylene glycol | 8 | 10 | 5 | 4 |
| 2-Pyrrolidone | 4 | 2 | 1 | — |
| Triethylene glycol monobutyl ether | 2 | 5 | 5 | 10 |
| Surfynol 465 | 1 | 1.1 | 0.7 | 0.5 |
| Pure water | Balance | Balance | Balance | Balance |

Water-soluble resin: Styrene-acrylic acid copolymer (molecular weight 18000, acid value 120)

Particle Diameter of Pigments in Ink Compositions: Part B

The particle diameter and the like of pigments in the ink compositions produced in parts B1 and B2 of the production of ink compositions were as summarized in Table B4 below. In Table B4, the particle diameter is in nm.

TABLE B4

| Ink composition | Color | Average particle diameter, nm |
|---|---|---|
| Example B1 | Cyan | 85 |
| Example B2 | Magenta | 90 |
| Example B3 | Yellow | 79 |
| Example B4 | Black | 95 |
| Example B5 | Cyan | 85 |
| Example B6 | Magenta | 88 |
| Example B7 | Yellow | 81 |
| Example B8 | Black | 98 |
| Comparative Example B1 | Cyan | 89 |
| Comparative Example B2 | Magenta | 90 |
| Comparative Example B3 | Yellow | 85 |
| Comparative Example B4 | Black | 100 |
| Comparative Example B5 | Cyan | 88 |
| Comparative Example B6 | Magenta | 88 |
| Comparative Example B7 | Yellow | 82 |
| Comparative Example B8 | Black | 99 |

Note:
1) For Examples B1 to B4, the crossflow membrane filtration was carried out after the production of the stock pigment dispersions.
2) For Examples B5 to B8, the crossflow membrane filtration was carried out after the production of the ink compositions.
3) For Comparative Examples B1 to B4, the crossflow membrane filtration was not carried out after the production of the stock pigment dispersions.
4) For Comparative Examples B5 to B8, the filtration was carried out through a cartridge filter after the production of the ink compositions.

Evaluation Test B

An ink jet printer EM-900C manufactured by Seiko Epson Corporation was loaded with each of the ink compositions prepared in Examples B1 to B8 and Comparative Examples B1 to B8, followed by printing on a specialty recording medium for ink jet recording (a specialty gloss film, manufactured by Seiko Epson Corporation). The amount of ink ejected was 0.040 μg per 1/360 dpi, and the resolution was 360×360 dpi.

Evaluation B1: Printing Stability

Continuous printing was carried out by the printer under conditions of temperature 40° C. and humidity 30% for a long period of time, and the prints were evaluated for dropouts of dots and scattering of ink according to the following criteria. The results were as described in Table B5 below.

Evaluation Criteria

A: The number of times of dropouts of dots or scattering of ink 96 hr after the start of the printing was less than ten.

B: The number of times of dropouts of dots or scattering of ink was less than ten, 72 hr after the start of the printing, and was ten or more, 96 hr after the start of the printing.

C: The number of times of dropouts of dots or scattering of ink was less than ten, 48 hr after the start of the printing, and was ten or more, 72 hr after the start of the printing.

D: The number of times of dropouts of dots or scattering of ink was less than ten, 24 hr after the start of the printing, and was ten or more, 48 hr after the start of the printing.

Evaluation B2: Color Reproduction

The ink compositions of Examples of B1 to B8 and Comparative Examples B1 to B8 were used as ink sets 1 to 4 as shown in Table B5 below. These ink sets 1 to 4 were filled into the ink jet printer. Cyan, magenta, yellow, and black colors each were output in equal amount at 40% duty on a specialty recording medium for ink jet recording to form blotted image patterns of deep gray color images, and the chroma of the images was measured and evaluated.

The chroma was measured with a Macbeth CE-7000 spectrophotometer (manufactured by Macbeth), and the coordinates of the L*a*b* color system of the color difference indication method specified in CIE (Commission International de l'Eclairage) were determined. The chroma C* was determined by equation (II); from the above data and was used as the quantitatively determined value. The measured values of L*, a*, b*, and chroma, C* were as summarized in Table B5 below.

$$C^* = [(a^*)^2 + (b^*)^2]^{1/2} \tag{II}$$

The results show that the sharpness of the image increases with increasing the chroma C*. In particular, the chroma of color in the mixed color portion shows that a high level of color reproduction is obtained in a dark portion such as a shadow of images.

A higher lightness L* value indicates that a more bright color can be output in an identical duty value (an identical impaction level), that is, the freedom of color reproduction is higher.

TABLE B5

| Ink Set | Ink composition | Evaluation A1 | Evaluation A2 | | | |
|---|---|---|---|---|---|---|
| | | | L* | b* | a* | C* |
| 1 | Example A1 | A | 29.8 | −25.3 | −15.5 | 29.7 |
| | Example A2 | A | | | | |
| | Example A3 | A | | | | |
| | Example A4 | A | | | | |
| 2 | Example A5 | A | 26.2 | −19.7 | −14.5 | 24.7 |
| | Example A6 | A | | | | |
| | Example A7 | A | | | | |
| | Example A8 | A | | | | |
| 3 | Comparative Example A1 | C | 30.1 | −24.5 | −15.2 | 28.8 |
| | Comparative Example A2 | D | | | | |
| | Comparative Example A3 | D | | | | |
| | Comparative Example A4 | C | | | | |

TABLE B5-continued

| Ink Set | Ink composition | Evaluation A1 | Evaluation A2 L* | b* | a* | C* |
|---|---|---|---|---|---|---|
| 4 | Comparative Example A5 | C | 27.0 | −18.2 | −14.1 | 23.0 |
| | Comparative Example A6 | C | | | | |
| | Comparative Example A7 | B | | | | |
| | Comparative Example A8 | B | | | | |

What is claimed is:

1. An ink composition produced by a process comprising the steps of:
dispersing a pigment that is suitable as a colorant for the ink composition in a solvent to prepare a stock pigment dispersion;
subjecting the stock pigment dispersion to crossflow membrane filtration to recover a liquid, which is passed through a filtration membrane, or a liquid, which is not passed through the filtration membrane, as a pigment dispersion, and
mixing the pigment dispersion with water and, optionally other components to form the ink composition.

2. The composition according to claim 1, wherein the membrane filtration is microfiltration or ultrafiltration.

3. The composition according to claim 1, wherein the membrane used in the membrane filtration has an average pore diameter of 1 nm to 1 μm.

4. The composition according to claim 1, wherein the pigment is dispersed with the aid of a polymeric dispersant or a surfactant.

5. A process for producing a dispersion of a pigment having a regulated average particle diameter, said pigment being suitable as a colorant in an ink composition, said process comprising the steps of:
dispersing the pigment in a solvent to prepare a stock pigment dispersion;
subjecting the stock pigment dispersion to first-stage crossflow membrane filtration to recover a liquid, which is passed through a first filtration membrane; and
subjecting said liquid to second-stage crossflow membrane filtration to recover a liquid, which is not passed through a second filtration membrane, as a pigment dispersion,
the average pore diameter of the first membrane used in the first-stage crossflow membrane filtration being larger than the average pore diameter of the second membrane used in the second-stage crossflow membrane filtration.

6. The process according to claim 5, wherein each of the first and second-stage membrane filtrations is microfiltration or ultrafiltration.

7. The process according to claim 5, wherein the average pore diameter of the membrane used in the first-stage crossflow membrane filtration is 0.05 to 1 μm, and the average pore diameter of the membrane used in the second-stage crossflow membrane filtration is 0.001 to 0.1μm.

8. The process according to claim 5, wherein the pigment is dispersed with the aid of a polymeric dispersant or a surfactant.

9. The process according to claim 5, wherein the average particle diameter of the pigment has been regulated so as to fall within the range of 10 to 300 nm.

10. An ink composition comprising the pigment dispersion produced by the process according to claim 5.

11. A process for producing a dispersion of a pigment having a regulated average particle diameter, said pigment being suitable as a colorant in an ink composition, said process comprising the steps of:
dispersing the pigment in a solvent to prepare a stock pigment dispersion;
subjecting the stock pigment dispersion to first-stage crossflow membrane filtration to recover a liquid, which is not passed through a first filtration membrane; and
subjecting said liquid to second-stage crossflow membrane filtration to recover a liquid, which is passed through a second filtration membrane, as a pigment dispersion,
the average pore diameter of the first membrane used in the first-stage crossflow membrane filtration being smaller than the average pore diameter of the second membrane used in the second-stage crossflow membrane filtration.

12. The process according to claim 11, wherein the average pore diameter of the membrane used in the first-stage crossflow membrane filtration is 0.001 to 0.1 μm, and the average pore diameter of the membrane used in the second-stage crossflow membrane filtration is 0.05 to 1 μm.

13. An ink composition comprising the pigment dispersion produced by the process according to claim 11.

14. A process for producing an ink composition comprising at least a pigment, a dispersant, and a water-soluble organic solvent, said pigment being suitable as a colorant in an ink composition, said process comprising the steps of:
preparing a stock ink comprising at least a pigment, a dispersant, and a water-soluble organic solvent; and
subjecting the stock ink to crossflow membrane filtration to recover a liquid, which is passed through a filtration membrane, or a liquid, which is not passed through the filtration membrane, as an ink composition.

15. The process according to claim 14, wherein the membrane filtration is microfiltration or ultrafiltration.

16. The process according to claim 14, wherein the membrane used in the membrane filtration has an average pore diameter of 1 nm to 1 μm.

17. The process according to claim 14, wherein the dispersant is a polymeric dispersant or a surfactant.

18. An ink composition produced by the process according to claim 7.

19. A process for producing an ink composition comprising at least a pigment, a dispersant, and a water-soluble organic solvent, said pigment being suitable as a colorant in an ink composition, said process comprising the steps of:
preparing a stock ink comprising at least a pigment, a dispersant, and a water-soluble organic solvent;
subjecting the stock ink to first-stage crossflow membrane filtration to recover a liquid which is passed through a first filtration membrane; and
subjecting said liquid to second-stage crossflow membrane filtration to recover a liquid, which is not passed through a second filtration membrane, as an ink composition,
the average pore diameter of the first membrane used in the first-stage crossflow membrane filtration being larger than the average pore diameter of the second membrane used in the second-stage crossflow membrane filtration.

20. The process according to claim 19, wherein the average pore diameter of the membrane used in the first-stage crossflow membrane filtration is 0.05 to 1 μm, and the average pore diameter of the membrane used in the second-stage crossflow membrane filtration is 0.001 to 0.1 μm.

21. The process according to claim 19, wherein the average particle diameter of the pigment has been regulated so as to fall within the range of 10 to 300 nm.

22. The process according to claim 19, wherein the dispersant is a polymeric dispersant or a surfactant.

23. An ink composition produced by the process according to claim 19.

24. A process for producing an ink composition comprising at least a pigment, a dispersant, and a water-soluble organic solvent, said pigment being suitable as a colorant in an ink composition, said process comprising the steps of:

preparing a stock ink comprising at least a pigment, a dispersant, and a water-soluble organic solvent;

subjecting the stock ink to first-stage crossflow membrane filtration to recover a liquid which is not passed through a first filtration membrane; and subjecting said liquid to second-stage crossflow membrane filtration to recover a liquid, which is passed through a second filtration membrane, as an ink composition, the average pore diameter of the first membrane used in the first-stage crossflow membrane filtration being smaller than the average pore diameter of the second membrane used in the second-stage crossflow membrane filtration.

25. The process according to claim 19, wherein each of the first-stage and second-stage membrane filtrations is microfiltration or ultrafiltration.

26. The process according to claim 24, wherein the average pore diameter of the membrane used in the first-stage crossflow membrane filtration is 0.001 to 0.1 μm, and the average pore diameter of the membrane used in the second-stage crossflow membrane filtration is 0.05 to 1 μm.

27. An ink composition produced by the process according to claim 15.

28. A method for ink jet printing comprising
(a) providing the ink composition of claim 1;
(b) ejecting droplets of the ink composition onto a recording medium to produce an image thereon.

29. A method for ink jet printing comprising
(a) providing the ink composition of claim 13;
(b) ejecting droplets of the ink composition onto a recording medium to produce an image thereon.

30. A method for ink jet printing comprising
(a) providing the ink composition of claim 18;
(b) ejecting droplets of the ink composition onto a recording medium to produce an image thereon.

31. A method for ink jet printing comprising
(a) providing the ink composition of claim 23;
(b) ejecting droplets of the ink composition onto a recording medium to produce an image thereon.

* * * * *